Patented Sept. 6, 1927.

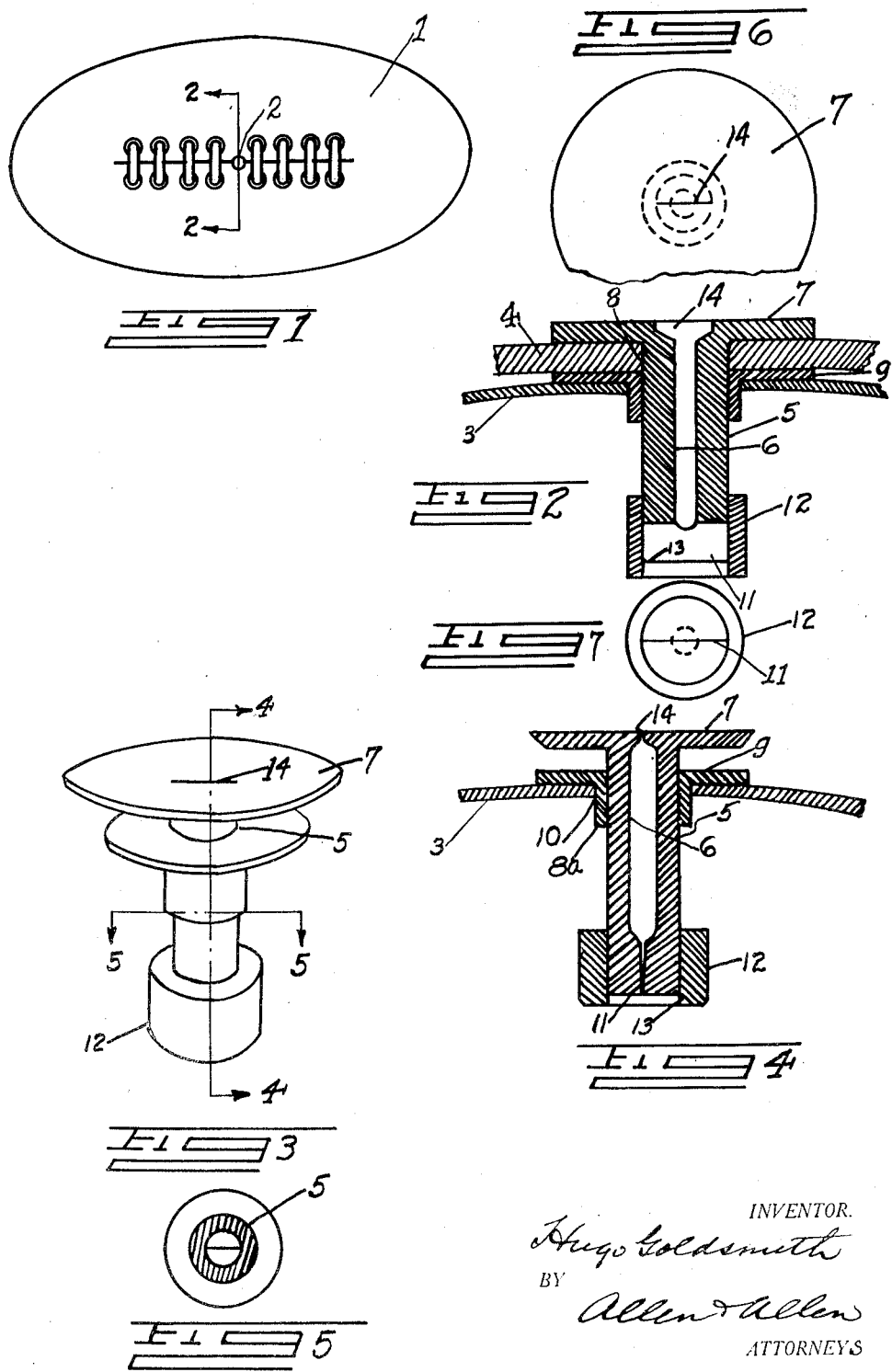

1,641,382

UNITED STATES PATENT OFFICE.

HUGO GOLDSMITH, OF CINCINNATI, OHIO, ASSIGNOR TO THE P. GOLDSMITH SONS COMPANY, OF CINCINNATI, OHIO, A CORPORATION OF OHIO.

VALVE FOR PLAYING BALLS.

Application filed December 5, 1925. Serial No. 73,502.

My invention relates to valves for balls such as footballs, basket balls and the like, which valves are of the automatic internally closing type which permit the inflation of balls with the insertion of a stem of a pump or other air supply and which automatically close upon inflation of the balls.

There have been a great many devices provided for eliminating the use of valve stems and metallic valve cases in connection with the bladders for footballs, basket balls and the like. These devices have never become popularized, mainly because of the fact that the structure has been one which will not effectively prevent leakage, or one which will render deflation very difficult, or one which is not possessed of the simple structure and strength, necessary for ready incorporation into a ball.

Provision is made by my invention for a structure built initially about a tubular piece of rubber, which serves as a connecting means between the bladder and the outer cover of the ball. The tube thus serves to keep the bladder in place, permitting ready access to the hole in the upper end thereof for inflation or deflation. Mounted over the tube, either integrally by the original molding operation or subsequently, are the elements required for connections, and automatic valve action. Thus at the outer end of the tube is a flange which is to be engaged by the cover of the ball; intermediate the outer end of the tube and the inner end is a flange used to secure the tube in place in the bladder. At the inner end of the tube the passageway is caused to communicate with terminal lips, formed in the tube, about which is arranged an elastic closure device that shuts the lips positively against efflux of air.

This leaves a straight passageway for insertion of a bleeding device, and still prevents leakage.

In connection with the arrangement of an elastic terminal ring, I have evolved a method of rendering it much more effective, and I have provided a mode of protecting the exposed lips of the tube, against clogging with dirt. All my improvements are directed to maintaining a straight line passage through a tubular member.

Referring to the drawing in which I have illustrated a preferred type of valve:—

Figure 1 is a perspective view of a football equipped with my novel valve.

Figure 2 is a sectional view as indicated by the lines 2—2 in Figure 1.

Figure 3 is an enlarged perspective view of the valve assembly in my preferred embodiment.

Figure 4 is a central vertical section as indicated by the lines 4—4 in Figure 3.

Figure 5 is a horizontal section as indicated by the lines 5—5 in Figure 3.

Figure 6 is a top plan view of the section shown in Figure 2.

Figure 7 is a bottom plan view of the same.

I have shown a football having an outer cover generally indicated at 1 with the slot 2 forming a laced opening through which the inner bladder 3 of the ball may be inserted. A cover flap 4 is provided which forms an inner cover for the laced opening, and retains the valve of the inner bladder in a fixed position with reference to the laced opening. While I have indicated a laced ball, my present invention in valves for inner bladders is equally adapted for use with a laceless ball in which the flange of my new valve can be secured to the outer cover thus retaining the tube in registry with a round aperture through which the stem of a pump may be inserted for inflating the ball.

The valve is formed with a tube 5 provided with a central longitudinally extending aperture adapted to act as an air passage which is indicated at 6. The shape of the passage may be either round or rectangular, the particular shape shown being round. About the tube I have shown the outer flange 7 extending, which forms a satisfactory means of securing the valve in fixed position with relation to the opening in the outer cover. The flange 7 is extended preferably on the outer side of the cover flap 4 with the tube extending through an aperture 8 in the cover flap. In some modifications it may be advisable to cement the flange 7 to the inner side of the cover, the essential function of the flange being to form a means of securing the valve to the cover. Secured about a hole formed in the bladder is a flange 9 which is cemented in place preferably on the outside of the bladder aperture 10, through which the tube extends into the ball. If the flange 9 is vulcanized onto the tube, it will have a sleeve portion 8ª.

To provide a valve which will seal from within and hold pneumatic pressure within the bladder the inner end of the passage 6 ends in a slit 11, which is preferably cut in the solid end of the tube after the valve is molded with a sharp razor-like instrument. Extending about the inner end of the tube adjacent the slit 11 is a ring 12 of resilient material which tends to keep the lips of the slit closed, thus preventing any tendency of the lips opening up and thus allowing air to leak out through the air passage. It is preferred that the resilient ring be disposed about the end of the tube as indicated at 13 in the drawings with the walls of the ring overlapping the lower end of the tube. I have found that disposing a ring member in such a position tends to keep the lips of the slit tightly together whereas if the ring extends about the tube over the central air passage the tendency is to bring the walls of the tube together and press the lips of the slit apart at their outer meeting ends.

The outer end of the air passage preferably tapers into an elongated slot 14 with meeting lips which are easily opened with the insertion of the stem of a pump but which otherwise, and when the ball is in use, prevents an accumulation of dust and dirt collecting in the air passage and thus causing leakage of the valve.

The flanges may be made separately and cemented or vulcanized onto the stem or the stem with the flanges and the central aperture may be molded integrally and the resilient ring member applied after the bottom slit is cut, or formed integrally and the slit cut with a pointed tool that does not cut the ring. Modifications will readily occur to those skilled in the art such as providing a metallic spring extending about the inner end of the tube to hold the lips together but for a simple efficient valve I prefer to utilize a resilient rubber ring. The sizes of the flanges are not essential although my invention contemplates generous proportions.

Having thus described my invention, what I claim as new and desire to secure by Letters Patent, is:—

A rubber valve structure for bladders comprising a tube having a lengthwise passage to receive an inflating tool, closing lips at the inner end of the tube, an automatically elastic closing annular member at the end of the tube, and projections forming part of the tube for mounting said valve on said bladder, said annular member extending beyond the end of the tube for tensioning the closing lips of the tube in compressed position.

HUGO GOLDSMITH.